(12) United States Patent
Chang et al.

(10) Patent No.: US 11,874,927 B2
(45) Date of Patent: Jan. 16, 2024

(54) ELECTRONIC APPARATUS AND SECURE FIRMWARE UPDATE METHOD THEREOF

(71) Applicant: VIA LABS, INC., New Taipei (TW)

(72) Inventors: Hui-Neng Chang, New Taipei (TW); Chi-Min Weng, New Taipei (TW); Cheng-Ming Huang, New Taipei (TW)

(73) Assignee: VIA LABS, INC., New Taipei (TW)

(*) Notice: Subject to any disclaimer, the term of this patent is extended or adjusted under 35 U.S.C. 154(b) by 259 days.

(21) Appl. No.: 17/466,220

(22) Filed: Sep. 3, 2021

(65) Prior Publication Data

US 2022/0350890 A1  Nov. 3, 2022

(30) Foreign Application Priority Data

Apr. 28, 2021 (TW) .................................. 110115324

(51) Int. Cl.
*G06F 21/57* (2013.01)
*G06F 13/16* (2006.01)
(Continued)

(52) U.S. Cl.
CPC ........ *G06F 21/572* (2013.01); *G06F 13/1668* (2013.01); *G06F 13/4282* (2013.01);
(Continued)

(58) Field of Classification Search
CPC ............... G06F 21/572; G06F 13/1668; G06F 13/4282; G06F 2213/0042
(Continued)

(56) References Cited

U.S. PATENT DOCUMENTS 11,644,984 B2 * 5/2023 Kloth ...................... G06F 21/75
713/2
2009/0271533 A1 * 10/2009 Asnaashari ........... G06F 3/0632
710/13
(Continued)

FOREIGN PATENT DOCUMENTS

CN  1293466    1/2007
CN  107430569  12/2017
(Continued)

OTHER PUBLICATIONS

Asokan, N., et al. "ASSURED: Architecture for secure software update of realistic embedded devices." IEEE Transactions on Computer-Aided Design of Integrated Circuits and Systems 37.11 (2018): pp. 2290-2300. (Year: 2018).*

(Continued)

*Primary Examiner* — Satish Rampuria
(74) *Attorney, Agent, or Firm* — WPAT, P.C.

(57) ABSTRACT

An electronic apparatus and a secure firmware update method thereof are provided. The electronic apparatus includes a first integrated circuit chip, a first non-volatile memory chip, a second integrated circuit chip and a second non-volatile memory chip. The first integrated circuit chip includes a secure firmware update console, and the first non-volatile memory chip includes a spare data storage space. The first non-volatile memory chip and the second non-volatile memory chip store a first firmware code of the first integrated circuit chip and a second firmware code of the second integrated circuit chip, respectively. Firmware code update data are transferred to and stored in the spare data storage space. The secure firmware update console performs a firmware update procedure by writing the firmware code update data into the second non-volatile memory (Continued)

chip to overwrite the second firmware code after passing a verification procedure on the firmware code update data.

12 Claims, 3 Drawing Sheets

(51) Int. Cl.
  *G06F 13/42* (2006.01)
  *H04L 9/32* (2006.01)
(52) U.S. Cl.
  CPC .... *H04L 9/3247* (2013.01); *G06F 2213/0042* (2013.01); *G06F 2221/033* (2013.01)
(58) Field of Classification Search
  USPC .................................................. 717/168–178
  See application file for complete search history.

(56) References Cited

U.S. PATENT DOCUMENTS

| | | | |
|---|---|---|---|
| 2011/0040960 A1* | 2/2011 | Deierling | G06F 21/572 |
| | | | 711/163 |
| 2011/0131403 A1* | 6/2011 | Ibrahim | G06F 21/572 |
| | | | 713/2 |
| 2011/0162082 A1 | 6/2011 | Paksoy et al. | |
| 2015/0186131 A1* | 7/2015 | Asnaashari | G06F 21/572 |
| | | | 710/13 |
| 2016/0124740 A1* | 5/2016 | Choi | G06F 8/654 |
| | | | 717/168 |
| 2017/0003956 A1* | 1/2017 | Chang | G06F 8/658 |
| 2022/0137947 A1* | 5/2022 | Jang | G06F 8/71 |
| | | | 717/169 |

FOREIGN PATENT DOCUMENTS

| | | |
|---|---|---|
| CN | 108227613 | 6/2018 |
| CN | 112699345 | 4/2021 |
| TW | 200917256 | 4/2009 |
| TW | M616016 | 8/2021 |
| WO | 2010014109 | 2/2010 |

OTHER PUBLICATIONS

Nath, Atul Prasad Deb, et al. "System-on-chip security architecture and CAD framework for hardware patch." 2018 23rd Asia and South Pacific Design Automation Conference (ASP-DAC). IEEE, 2018.pp.pp. 733-738. (Year: 2018).*

Zandberg, Koen, et al. "Secure firmware updates for constrained iot devices using open standards: A reality check." IEEE Access 7 (2019): pp. 71907-71920. (Year: 2019).*

Fiorin, Leandro, et al. "Secure memory accesses on networks-on-chip." IEEE Transactions on Computers 57.9 (2008): pp. 1216-1229. (Year: 2008).*

Da Rolt, Jean, et al. "Test versus security: Past and present." IEEE Transactions on Emerging topics in Computing 2.1 (2014): pp. 50-62. (Year: 2014).*

Pearson, Bryan, et al. "On misconception of hardware and cost in IoT security and privacy." ICC 2019-2019 IEEE International Conference on Communications (ICC). IEEE, 2019.pp. 1-7 (Year: 2019).*

SIPO, "Office action", dated May 25, 2023.

* cited by examiner

ELECTRONIC APPARATUS AND SECURE FIRMWARE UPDATE METHOD THEREOF

FIELD OF THE INVENTION

The present disclosure relates to an electronic apparatus and a secure firmware update method thereof, and particularly to an electronic apparatus adopting USB type-C and a secure firmware update method thereof.

BACKGROUND OF THE INVENTION

A single electronic apparatus or system usually has multiple integrated circuit chips cooperating in performing tasks. Nevertheless, these integrated circuit chips execute respective firmware codes. These integrated circuit chips are probably provided by different manufacturers so that the firmware codes corresponding to the integrated circuit chips are stored in respective and separate non-volatile memory chips. For example, the electronic apparatus or system has an integrated circuit chip $A_{IC}$, a non-volatile memory chip $A_{mem}$, an integrated circuit chip $B_{IC}$ and a non-volatile memory chip $B_{mem}$. The integrated circuit chip $A_{IC}$ is directly coupled to the non-volatile memory chip $A_{mem}$, while the integrated circuit chip $B_{IC}$ is directly coupled to the non-volatile memory chip $B_{mem}$. The integrated circuit chip $A_{IC}$ reads its firmware code $A_{code}$ from the non-volatile memory chip $A_{mem}$ and executes the firmware code $A_{code}$ to provide function $A_{fun}$. Similarly, the integrated circuit chip $B_{IC}$ reads its firmware code $B_{code}$ from the non-volatile memory chip $B_{mem}$ and executes the firmware code $B_{code}$ to provide function $B_{fun}$, cooperating with the function $A_{fun}$ provided by the integrated circuit chip $A_{IC}$. As described, in the conventional electronic apparatus or system, the firmware codes corresponding to different integrated circuit chips are usually stored in different non-volatile memory chips.

For this reason, different update tools/programs are required to perform firmware update processes of the integrated circuit chips in the single electronic apparatus or system (e.g. Component Firmware Update (CFU) for window system) to update the firmware code $A_{code}$ and the firmware code $B_{code}$. The firmware update processes involve different integrated circuit chips and different data transmission paths. For example, the firmware update process uses an updating tool $A_{tool}$ and a data transmission path $A_{path}$ to update the firmware code $A_{code}$ stored in the non-volatile memory chip $A_{mem}$. After updating the firmware code $A_{code}$, the firmware update process uses another updating tool $B_{tool}$ and another data transmission path $B_{path}$ to update the firmware code $B_{code}$ stored in the non-volatile memory chip $B_{mem}$. Considering the information security, each integrated circuit chip should be further provided with a secure update engine to support the secure firmware update processes. On the contrary, if one of the integrated circuit chips in the electronic apparatus or system is not provided with the secure update engine, the integrated circuit chip can not achieve firmware update with security, which probably results in vulnerability in information security.

SUMMARY OF THE INVENTION

An aspect of the present disclosure provides an electronic apparatus. The electronic apparatus at least includes a first integrated circuit chip, a first non-volatile memory chip, a second integrated circuit chip and a second non-volatile memory chip. The first integrated circuit chip includes a secure firmware update console. The first non-volatile memory chip is in communication with the first integrated circuit chip and configured to store a first firmware code of the first integrated circuit chip. The first non-volatile memory chip further includes a spare data storage space. The second integrated circuit chip is in communication with the first integrated circuit chip. The second non-volatile memory chip is in communication with the second integrated circuit chip and configured to store a second firmware code of the second integrated circuit chip. After firmware code update data corresponding to the second non-volatile memory chip are transferred to the spare data storage space, the secure firmware update console of the first integrated circuit chip performs a verification procedure on the firmware code update data stored in the spare data storage space, and performs a firmware update procedure by writing the firmware code update data into the second non-volatile memory chip to overwrite the second firmware code after passing the verification procedure.

Another aspect of the present disclosure provides a secure firmware update method applied to an electronic apparatus. The electronic apparatus at least includes a first integrated circuit chip having a secure firmware update console; a first non-volatile memory chip, in communication with the first integrated circuit chip, for storing a first firmware code of the first integrated circuit chip wherein the first non-volatile memory chip has a spare data storage space; a second integrated circuit chip in communication with the first integrated circuit chip; and a second non-volatile memory chip, in communication with the second integrated circuit chip, for storing a second firmware code of the second integrated circuit chip. In the secure firmware update method, firmware code update data corresponding to the second non-volatile memory chip are transferred to the spare data storage space. Then, the secure firmware update console of the first integrated circuit chip performs a verification procedure on the firmware code update data stored in the spare data storage space. A firmware update procedure is performed to write the firmware code update data into the second non-volatile memory chip to overwrite the second firmware code after passing the verification procedure.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the specification and claims, the term "(electrically) couple", "(electrically) connect" or "communication" means any possible connection irrespective of direct connection manner or indirect connection manner. For example, when a first device is coupled to or in communication with a second device in the present disclosure, it may be interpreted that the first device and the second device can transmit signals to or receive signals from each other through a cable line or a wireless medium with or without any intermediate device. Similar reference labels in different embodiments may represent components or steps with similar or substitutable function so that the specified function of these components or steps could be applied to any embodiments of the present disclosure.

Figure 1:
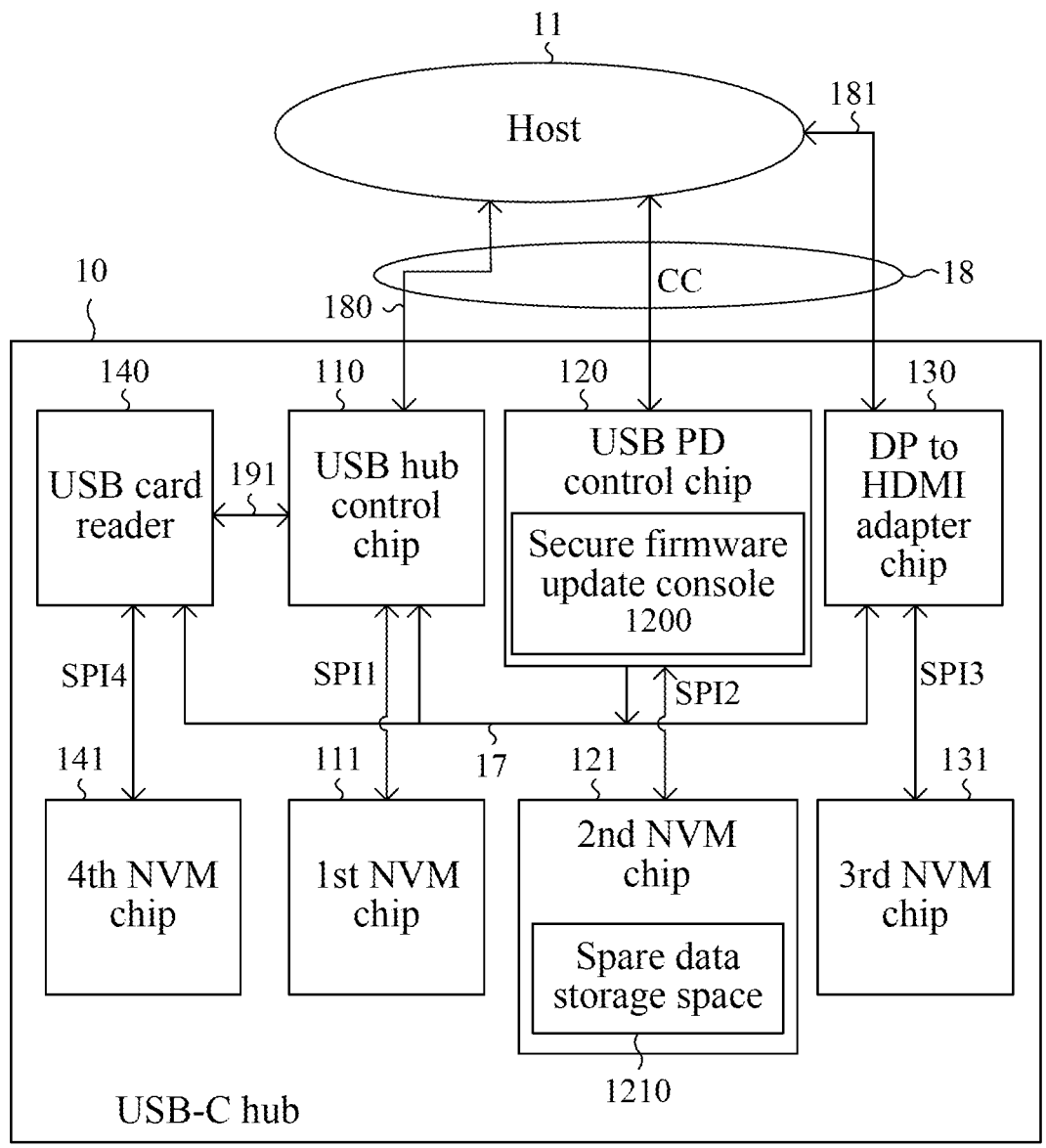
FIG. 1 is a block diagram illustrating an electronic apparatus/system according to an embodiment of the present disclosure.

Please refer to FIG. 1, which is a block diagram illustrating an electronic apparatus/system according to an embodiment of the present disclosure. Universal Serial Bus type-C (USB type-C, also referred to USB-C) is adopted in this embodiment for illustration purposes. A USB-C hub 10 is shown in the diagram, and could be implemented by a single multi-function dock or a USB dock embedded into any electronic device. The USB-C hub 10 mainly includes at least a USB hub control chip 110, a first non-volatile memory (NVM) chip 111, a USB power delivery (PD) control chip 120, a second non-volatile memory chip 121, a DisplayPort (DP) to high definition multimedia interface (HDMI) adapter chip 130, a third non-volatile memory chip 131, a USB card reader 140 and a fourth non-volatile memory chip 141. The USB-C hub 10 is electrically coupled to a host 11 through a USB cable 18. The host 11 could be implemented by a personal computer, a notebook computer, a tablet, a handheld phone, a personal digital assistant (PDA), a media player, a digital camera, a camcorder, a video game console and the like.

In an embodiment, the host 11 implemented by a personal computer is in communication with the USB hub control chip 110 of the USB-C hub 10 through a USB channel 180 in the USB cable 18. The USB hub control chip 110 is further in communication with the USB card reader 140 through a USB channel 191. Thus, the host 11 (i.e. the personal computer) can read data from or write data into the USB card reader 140. In another embodiment, the host 11 implemented by a media player is in communication with the DP to HDMI adapter chip 130 through a DP channel 181 in the USB cable 18. Thus, the DP signals outputted from the host 11 (i.e. the media player) could be transmitted to the DP to HDMI adapter chip 130 and then converted into HDMI signals. The HDMI signals are outputted to display corresponding content on a high definition display (not shown). In addition, the USB PD control chip 120 is in communication with the host 11 through a configuration channel CC in the USB cable 18.

The first non-volatile memory chip 111, the second non-volatile memory chip 121, the third non-volatile memory chip 131 and the fourth non-volatile memory chip 141 store therein individual firmware codes corresponding to the USB hub control chip 110, the USB PD control chip 120, the DP to HDMI adapter chip 130 and the USB card reader 140, respectively. The first non-volatile memory chip 111, the second non-volatile memory chip 121, the third non-volatile memory chip 131 and the fourth non-volatile memory chip 141 use Serial Peripheral Interface (SPI) buses SPI1, SPI2, SPI3 and SPI4 to respectively and correspondingly connect the USB hub control chip 110, the USB PD control chip 120, the DP to HDMI adapter chip 130 and the USB card reader 140.

A common bus 17 is also provided to electrically connect the USB hub control chip 110, the USB PD control chip 120, the DP to HDMI adapter chip 130 and the USB card reader 140. Further, a spare data storage space 1210 is provided in the second non-volatile memory chip 121 corresponding to the USB PD control chip 120. The common bus 17 could be implemented by an Inter-Integrated Circuit ($I^2C$) or a universal asynchronous receiver-transmitter (UART). The firmware update method using the common bus 17 and the spare data storage space 1210 is given in the following description.

Figure 2:
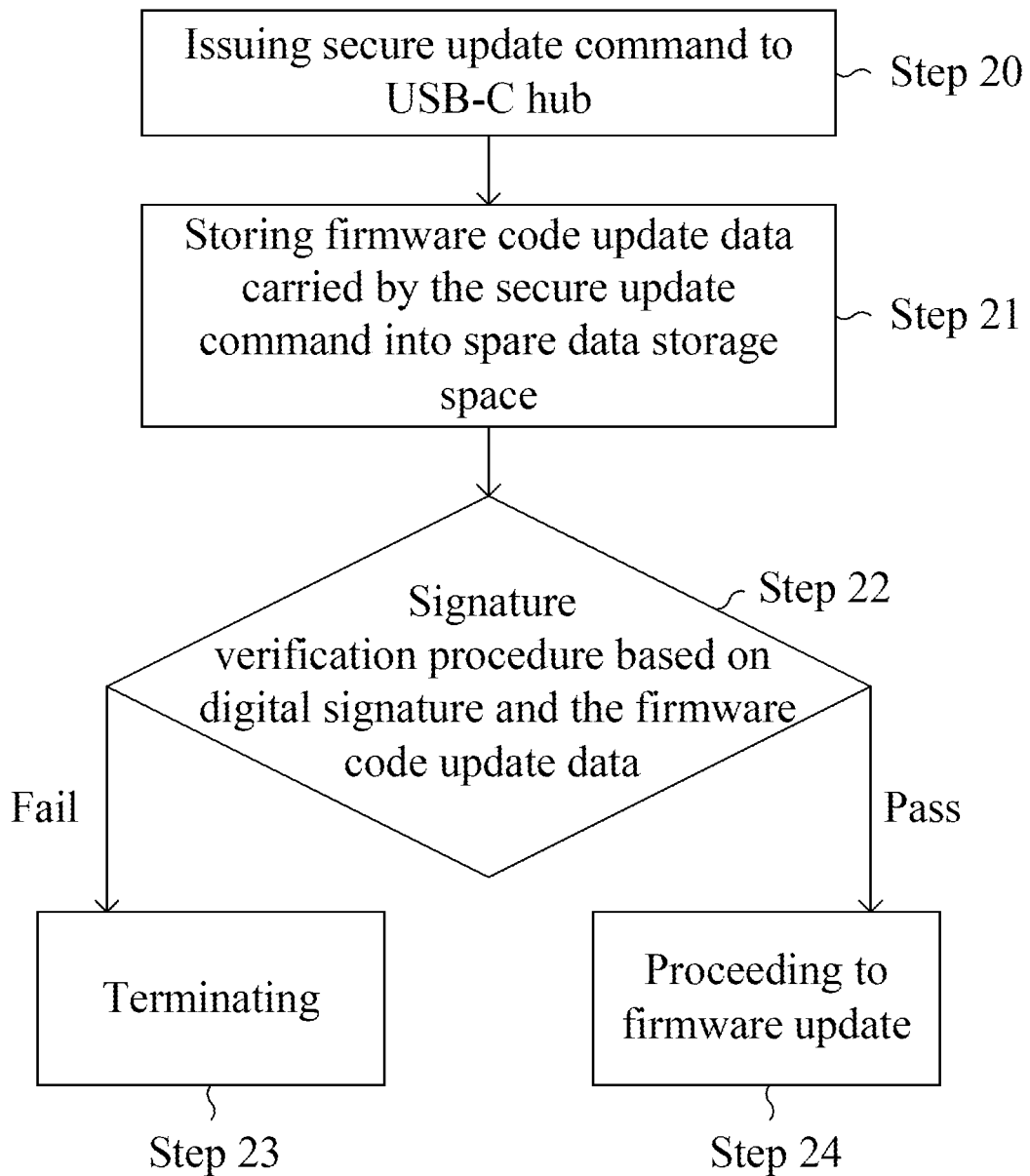
FIG. 2 is a flowchart illustrating a secure firmware update method for multiple non-volatile memory chips according to an embodiment of the present disclosure.

Please refer to FIG. 2, which is a flowchart illustrating a secure firmware update method of multiple non-volatile memory chips according to an embodiment of the present disclosure. For illustration purposes, a personal computer is taken as the host 11 in the embodiment. At first, when the operating system executed on the host 11 finds that a new firmware code of a specific device coupled to the USB-C hub 10 is released on the web and the related data file has been successfully downloaded in the host 11 for firmware update, the host 11 issues a secure update command for updating the firmware code of the specific device to the USB-C hub 10 (step 20). The secure update command may include firmware code data for update (referred as firmware code update data in the disclosure) and a digital signature corresponding to/associated with the firmware code update data. The USB PD control chip 120 of the USB-C hub 10 receives the secure update command and stores the firmware code update data into the spare data storage space 1210 (step 21). The secure firmware update console 1200 disposed in the USB PD control chip 120 uses the digital signature and the firmware code update data taken from the spare data storage space 1210 to perform a signature verification procedure (step 22). If the signature verification procedure fails, the firmware update method terminates (step 23). Otherwise, if the signature verification procedure is successfully completed, the method proceeds to the firmware update of the specific device (step 24). The digital signature could be an encrypted hash value obtained by using a hash function to obtain a hash value of partial or complete firmware code update data at the transmitting end and using a private key, owned by the manufacturer of the specific device, to encrypt the hash value.

The signature verification procedure in step 22 may include the following steps. At first, the secure firmware update console 1200 reads out the firmware code update data from the spare data storage space 1210. The secure firmware update console 1200 uses a hash function to obtain a check hash value of the partial or complete firmware code update data. Meanwhile, the secure firmware update console 1200 uses a public key to decrypt the digital signature to get the hash value carried in the digital signature. The public key is provided by the specific device manufacturer owning the private key. The secure firmware update console 1200 compares the hash value after decryption and the check hash value. If the two hash values match, the signature verification procedure is successfully completed; otherwise, the signature verification procedure fails.

There are two conditions involved in the firmware update procedure (step 24). In the first condition, the specific device requiring the firmware update is the USB PD control chip 120. In other words, the second non-volatile memory chip 121 need not get the firmware code update data through an external bus. At this time, the firmware code update data stored in the spare data storage space 1210 are transferred to the second non-volatile memory chip 121 directly to overwrite the old firmware code.

In the second condition, the specific device requiring the firmware update is a chip other than the USB PD control chip 120 (e.g. the USB hub control chip 110, the DP to HDMI adapter chip 130 or the USB card reader 140 in FIG. 1). In other words, the firmware code update data are not stored in the corresponding non-volatile memory chip at the present moment. At this time, the firmware code update data stored in the spare data storage space 1210 are transferred to the corresponding non-volatile memory chip through the common bus 17 and the corresponding SPI bus SPI1, SPI3 or SPI4 to overwrite the old firmware code. For example, in the firmware update procedure, the USB PD control chip 120 reads the firmware code update data stored in the spare data storage space 1210 through the SPI bus SPI2, and transmits the firmware code update data to a specific chip (e.g. USB hub control chip 110) through the common bus 17. Then, the specific chip writes the firmware code update data into a corresponding non-volatile memory chip (e.g. the first non-volatile memory chip 111) through a corresponding SPI bus (e.g. the SPI bus SPI1) to overwrite the old firmware code. Thus, even though the chips other than the USB PD control chip 120 are not provided with a secure update engine, the present disclosure can still support secure firmware update function for these chips.

Figure 3:
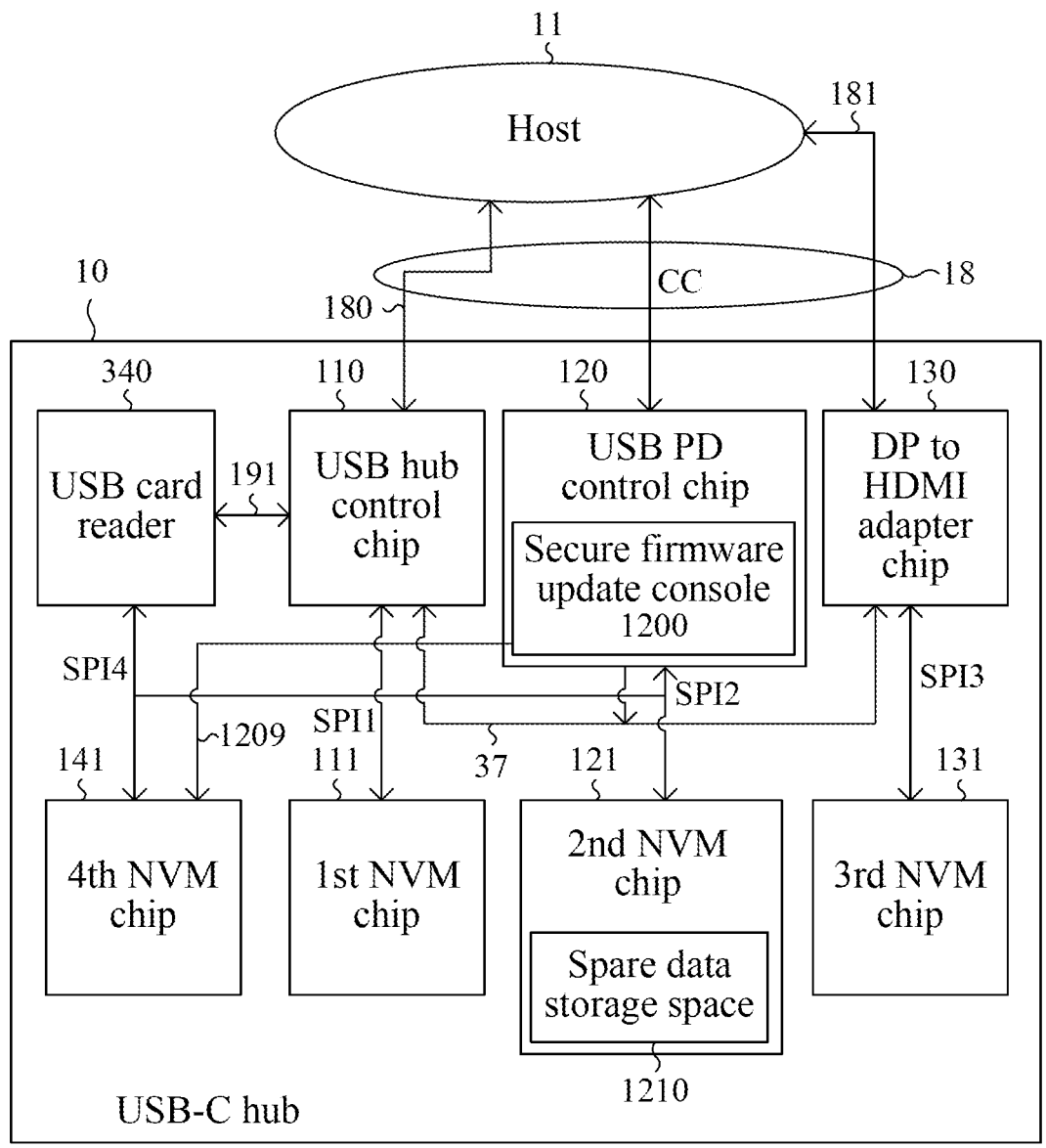
FIG. 3 is block diagram illustrating an electronic apparatus/system according to another embodiment of the present disclosure.

Please refer to FIG. 3, which is a block diagram illustrating an electronic apparatus/system according to another embodiment of the present disclosure. Also, USB-C is adopted in this embodiment for illustration purposes. The electronic apparatus/system in FIG. 3 has similar structure to the electronic apparatus/system in FIG. 1, but some chips in the electronic apparatus may not support Inter-Integrated Circuit (I2C). In the embodiment, the USB card reader 340 does not support a common bus implemented by the Inter-Integrated Circuit. Hence, data transmission through the common bus 37 can not extend to the USB card reader 340. The connection between the USB PD control chip 120 and the fourth non-volatile memory chip 141 corresponding to the USB card reader 340 is modified to use SPI buses (e.g. SPI buses SPI2 and SPI4) which are supported by most chips. Furthermore, the USB PD control chip 120 performs chip select (CS) through a general-purpose input/output (GPIO) pin 1209. Therefore, when the USB card reader 340 requires firmware update, the GPIO pin 1209 of the USB PD control chip 120 issues a chip select signal to the fourth non-volatile memory chip 141. Meanwhile, the firmware code update data stored in the spare data storage space 1210 are transmitted to the fourth non-volatile memory chip 141 through the SPI buses SPI2 and SPI4. Thus, the old firmware code is replaced by the latest firmware code data. By this method, even though the chips other than the USB PD control chip 120 are not provided with a secure update engine, the present disclosure can still support secure firmware update function for these chips.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic apparatus comprising:
a first integrated circuit chip comprising a secure firmware update console;
a first non-volatile memory chip, in communication with the first integrated circuit chip, for storing a first firmware code of the first integrated circuit chip, the first non-volatile memory chip comprising a spare data storage space;
a second integrated circuit chip in communication with the first integrated circuit chip; and
a second non-volatile memory chip, in communication with the second integrated circuit chip, for storing a second firmware code of the second integrated circuit chip,
wherein after firmware code update data corresponding to the second non-volatile memory chip are transferred to the spare data storage space, the secure firmware update console of the first integrated circuit chip performs a verification procedure on the firmware code update data stored in the spare data storage space, and performs a firmware update procedure by writing the firmware code update data into the second non-volatile memory chip to overwrite the second firmware code after passing the verification procedure, wherein the verification procedure is a signature verification procedure wherein the secure firmware update console uses a digital signature and the firmware code update data stored in the spare data storage space to perform the signature verification procedure.

2. The electronic apparatus according to claim 1, wherein the electronic apparatus is a USB-C hub in communication with a host through a USB cable, the first integrated circuit chip is a USB power delivery control chip in communication with the first non-volatile memory chip through a first Serial Peripheral Interface bus, and the second integrated circuit chip is in communication with the second non-volatile memory chip through a second Serial Peripheral Interface bus.

3. The electronic apparatus according to claim 2,
wherein the USB power delivery control chip is in communication with the second integrated circuit chip through a common bus,
an operating system executed on the host issues a secure update command about updating the second firmware code of the second integrated circuit chip to the USB-C hub after detecting that a new firmware code corresponding to the second integrated circuit chip in the USB-C hub is released and downloaded wherein the secure update command comprises the firmware code update data and the digital signature corresponding to the firmware code update data, and
the firmware code update data are transferred to the spare data storage space.

4. The electronic apparatus according to claim 3, wherein the firmware update procedure comprises:
the first integrated circuit chip reading the firmware code update data from the spare data storage space through the first Serial Peripheral Interface bus, and transmitting the firmware code update data to the second integrated circuit chip through the common bus; and
the second integrated circuit chip writing the firmware code update data into the second non-volatile memory chip through the second Serial Peripheral Interface bus to overwrite the second firmware code.

5. The electronic apparatus according to claim 2, wherein
the first Serial Peripheral Interface bus is electrically coupled to the second Serial Peripheral Interface bus, and the USB power delivery control chip is electrically coupled to the second non-volatile memory chip through a general-purpose input/output pin,
an operating system executed on the host issues a secure update command about updating the second firmware code of the second integrated circuit chip to the USB-C hub after detecting that a new firmware code corresponding to the second integrated circuit chip in the USB-C hub is released and downloaded wherein the secure update command comprises the firmware code update data and a digital signature corresponding to the firmware code update data,
the firmware code update data are transferred to the spare data storage space, and
the verification procedure is a signature verification procedure wherein the secure firmware update console uses the digital signature and the firmware code update data stored in the spare data storage space to perform the signature verification procedure.

6. The electronic apparatus according to claim 5, wherein the firmware update procedure comprises that the general-purpose input/output pin of the USB power delivery control chip issues a chip select signal to the second non-volatile memory chip, and the firmware code update data stored in the spare data storage space are transferred to the second non-volatile memory chip through the first Serial Peripheral Interface bus and the second Serial Peripheral Interface bus to overwrite the second firmware code.

7. A secure firmware update method applied to an electronic apparatus comprising at least a first integrated circuit chip having a secure firmware update console; a first non-volatile memory chip, in communication with the first integrated circuit chip, for storing a first firmware code of the first integrated circuit chip wherein the first non-volatile memory chip has a spare data storage space; a second integrated circuit chip in communication with the first integrated circuit chip; and a second non-volatile memory chip, in communication with the second integrated circuit chip, for storing a second firmware code of the second integrated circuit chip, the secure firmware update method comprising steps of:
transferring firmware code update data corresponding to the second non-volatile memory chip to the spare data storage space;
the secure firmware update console of the first integrated circuit chip performing a verification procedure on the firmware code update data stored in the spare data storage space, wherein the verification procedure is a signature verification procedure wherein the secure firmware update console uses a digital signature and the firmware code update data stored in the spare data storage space to perform the signature verification procedure; and
performing a firmware update procedure by writing the firmware code update data into the second non-volatile memory chip to overwrite the second firmware code after passing the verification procedure.

8. The secure firmware update method according to claim 7, wherein the electronic apparatus is a USB-C hub in communication with a host through a USB cable; the first circuit chip is a USB power delivery control chip in communication with the first non-volatile memory chip through a first Serial Peripheral Interface bus; and the second integrated circuit chip is in communication with the second non-volatile memory chip through a second Serial Peripheral Interface bus.

9. The secure firmware update method according to claim 8, wherein
the USB power delivery control chip is in communication with the second integrated circuit chip through a common bus,
an operating system executed on the host issues a secure update command about updating the second firmware code of the second integrated circuit chip to the USB-C hub after detecting that a new firmware code corresponding to the second integrated circuit chip in the USB-C hub is released and downloaded wherein the secure update command comprises the firmware code update data and the digital signature corresponding to the firmware code update data, and
the firmware code update data are transferred to the spare data storage space.

10. The secure firmware update method according to claim 9 wherein the firmware update procedure comprises steps of:
the first integrated circuit chip reading the firmware code update data from the spare data storage space through the first Serial Peripheral Interface bus, and transmitting the firmware code update data to the second integrated circuit chip through the common bus; and
the second integrated circuit chip writes the firmware code update data into the second non-volatile memory chip through the second Serial Peripheral Interface bus to overwrite the second firmware code.

11. The secure firmware update method according to claim 8, wherein
the first Serial Peripheral Interface bus is electrically coupled to the second Serial Peripheral Interface bus, and the USB power delivery control chip is electrically coupled to the second non-volatile memory chip through a general-purpose input/output pin,
an operating system executed on the host issues a secure update command about updating the second firmware code of the second integrated circuit chip to the USB-C hub after detecting that a new firmware code corresponding to the second integrated circuit chip in the USB-C hub is released and downloaded wherein the secure update command comprises the firmware code update data and a digital signature corresponding to the firmware code update data,
the firmware code update data are transferred to the spare data storage space, and
the verification procedure is a signature verification procedure wherein the secure firmware update console uses the digital signature and the firmware code update data stored in the spare data storage space to perform the signature verification procedure.

12. The secure firmware update method according to claim 11, wherein the firmware update procedure comprises steps of:
the general-purpose input/output pin of the USB power delivery control chip issuing a chip select signal to the second non-volatile memory chip;
transferring the firmware code update data stored in the spare data storage space to the second non-volatile memory chip through the first Serial Peripheral Interface bus and the second Serial Peripheral Interface bus to overwrite the second firmware code.

* * * * *